Figure 1:
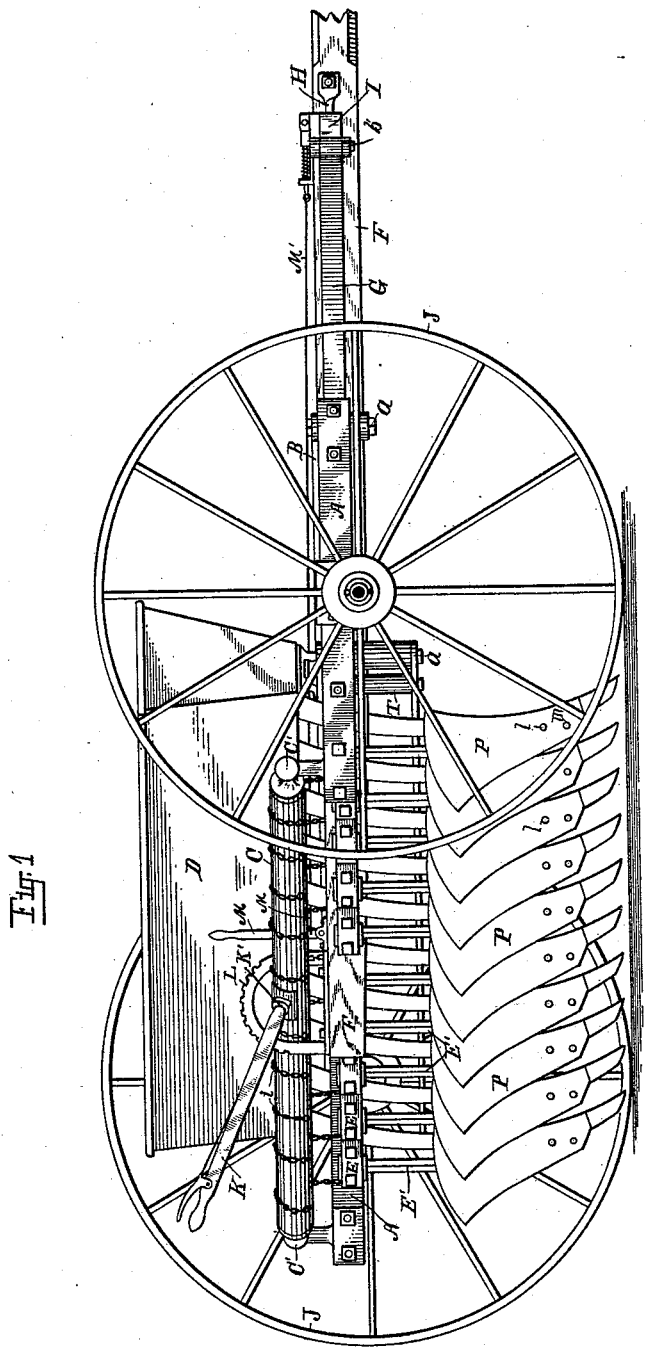

(No Model.)　　　　　　　　　　　　　　　　4 Sheets—Sheet 1.
G. B. ST. JOHN.
CULTIVATOR AND GRAIN DRILL.

No. 549,879.　　　　　　　　　　Patented Nov. 12, 1895.

Witnesses:　　　　　　　　　　　　　　　Inventor,
　　　　　　　　　　　　　　　　　　　　Garland B. St. John
　　　　　　　　　　　　　　　　　　By Fred L. Chappell
　　　　　　　　　　　　　　　　　　　　Att'y.

(No Model.) 4 Sheets—Sheet 2.
G. B. ST. JOHN.
CULTIVATOR AND GRAIN DRILL.
No. 549,879. Patented Nov. 12, 1895.
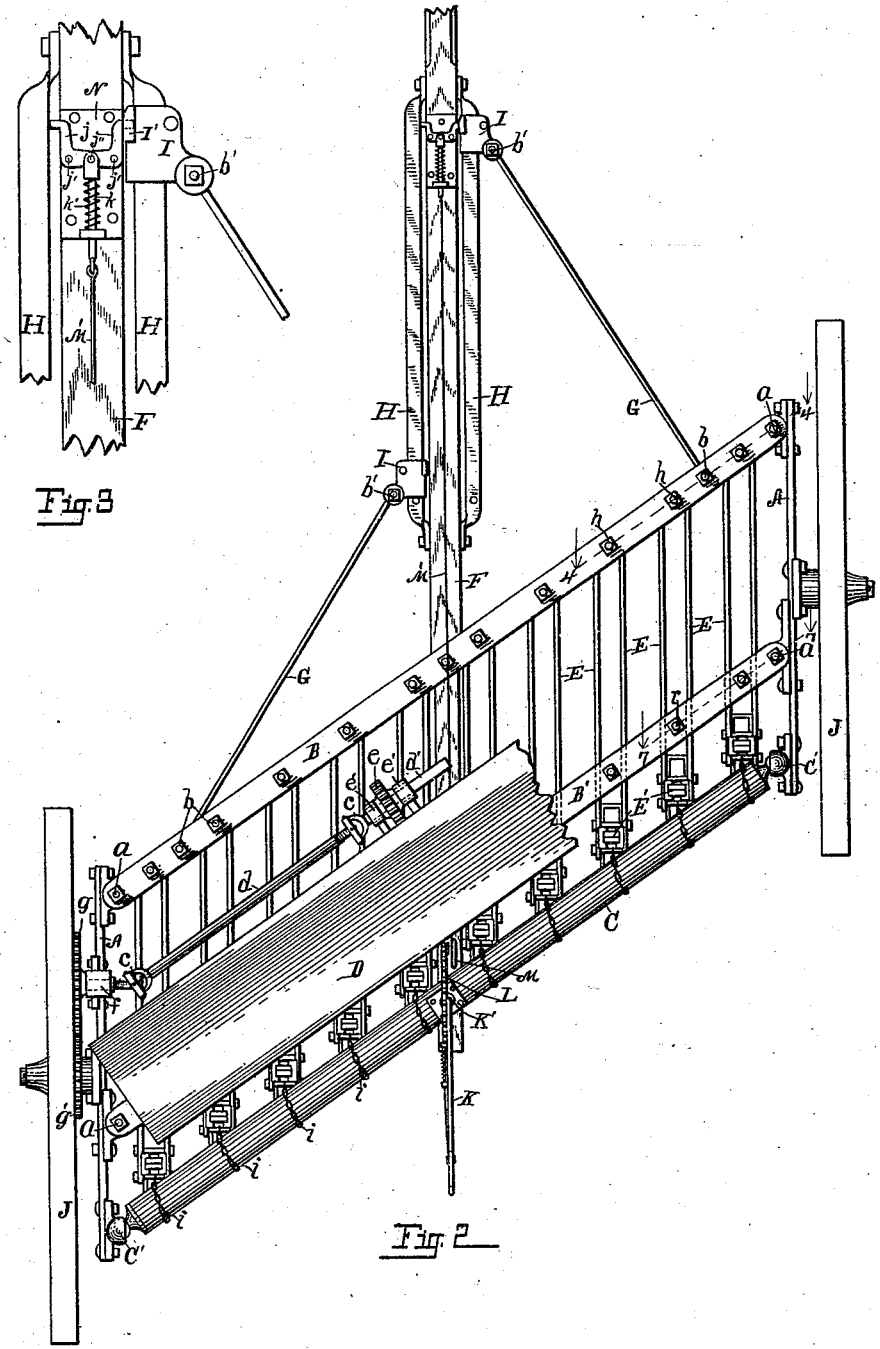
Witnesses:
Walter S. Wood
Marian Longyear
Inventor
Garland B. St. John
By Fred L. Chappell
Atty.

(No Model.) 4 Sheets—Sheet 3.
G. B. ST. JOHN.
CULTIVATOR AND GRAIN DRILL.
No. 549,879. Patented Nov. 12, 1895.
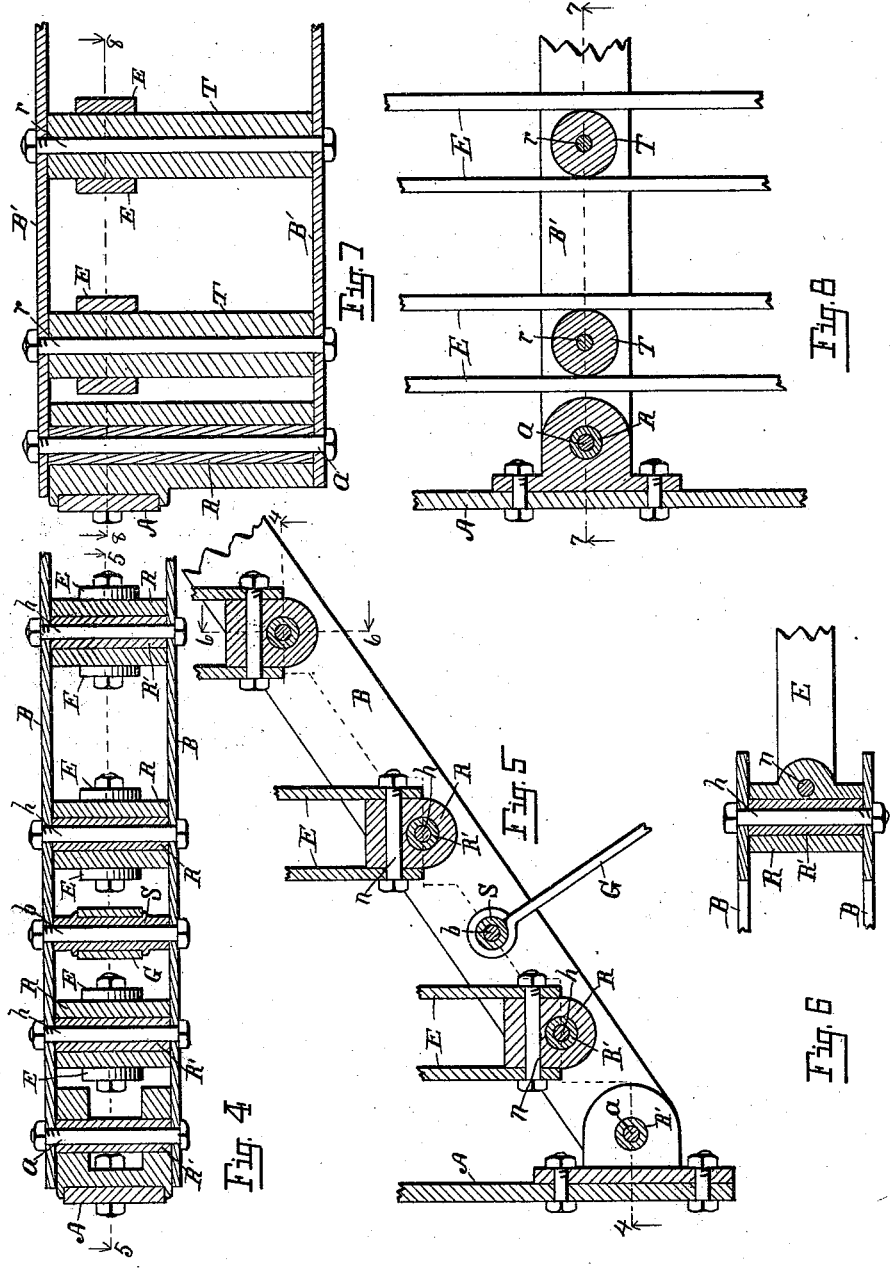
Witnesses:
Walter S. Wood
Marian Longyear
Inventor,
Garland B. St. John
By Fred L. Chappell
Att'y (No Model.) 4 Sheets—Sheet 4.
G. B. ST. JOHN.
CULTIVATOR AND GRAIN DRILL.
No. 549,879. Patented Nov. 12, 1895.
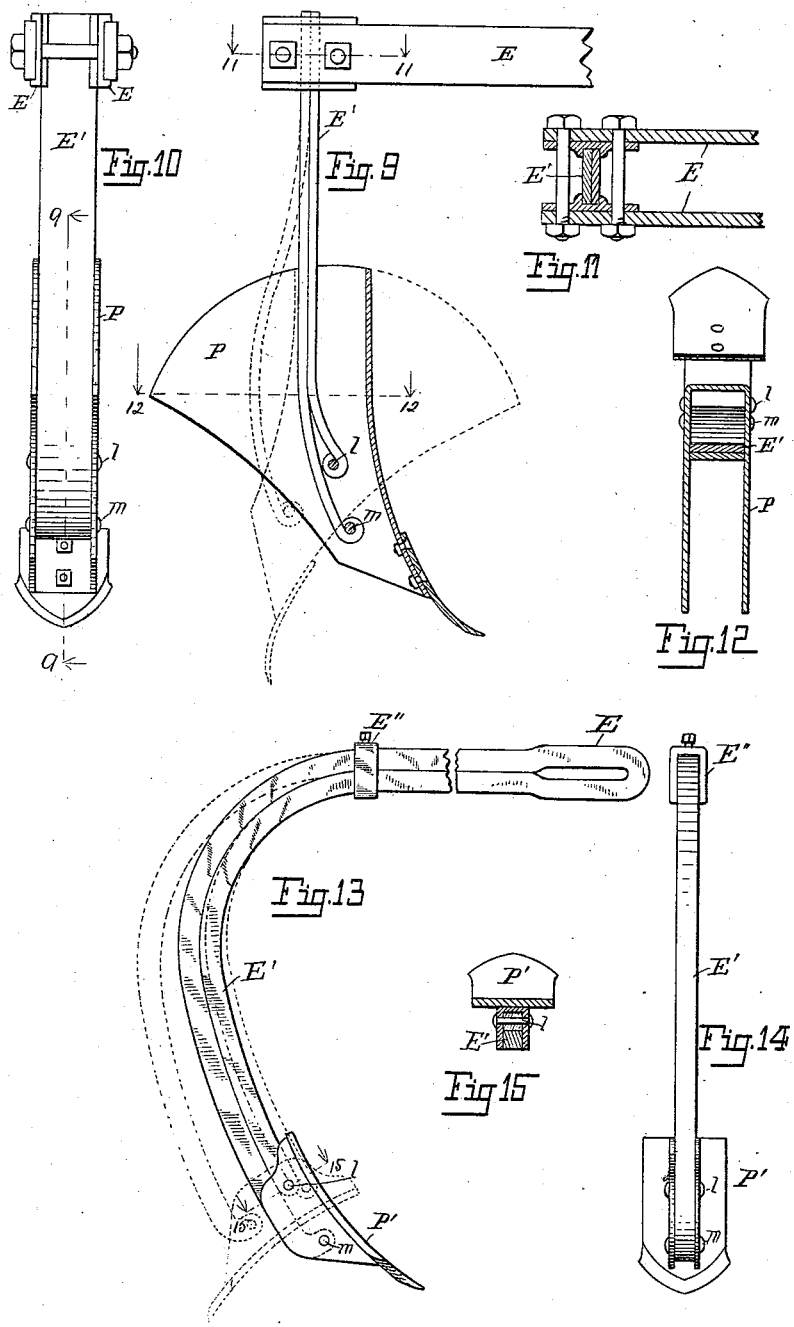

UNITED STATES PATENT OFFICE.

GARLAND B. ST. JOHN, OF KALAMAZOO, MICHIGAN.

CULTIVATOR OR GRAIN-DRILL.

SPECIFICATION forming part of Letters Patent No. 549,879, dated November 12, 1895.

Application filed November 22, 1894. Serial No. 529,565. (No model.)

*To all whom it may concern:*

Be it known that I, GARLAND B. ST. JOHN, a citizen of the United States, residing at the city of Kalamazoo, in the county of Kalamazoo and State of Michigan, have invented certain new and useful Improvements in Cultivators or Grain-Drills, of which the following is a specification.

My invention relates to improvements in cultivators or grain-drills.

As heretofore constructed the sides of cultivators and of grain-drills have usually been made symmetrical, the teeth on each side corresponding to those on the opposite side, the teeth usually alternating in their position, one forward and one back, to prevent clogging, which arrangement leaves the ground uneven. In grain-drills the hoes have usually projected into the ground with comparatively sharp points, which of necessity throws the grain in a narrow trench in the soil and covers it there. Cultivators and grain-drills that have been made heretofore have usually either been provided with a wooden pin to allow the teeth to break back when an obstruction is encountered or else there has been a complication of springs and rods for accomplishing the same result.

The object of my invention, it will be readily understood, is to overcome these objections; and the objects are, first, to provide a cultivator or seed-drill which shall leave the ground smooth and cultivated to an even depth; second, to provide a tooth that will be adapted for a grain-drill that shall sow the grain at an even depth and distribute it well over the ground; third, to provide a cultivator or grain-drill that will run evenly and steadily without jerking; fourth, to provide a cultivator or grain-drill which will tend to run in a straight line; fifth, to provide an improved mechanism to operate the cultivator or grain-drill; sixth, to provide an improved spring-break for a cultivator or grain-drill tooth; seventh, to provide an improved spring break-tooth for tillage purposes generally; eighth, to provide a spring-break that can be easily and conveniently adjusted; ninth, to provide a cultivator or grain-drill that shall leave the entire field smooth without causing furrows or breaks in it from one side to the other, and, tenth, to provide an improved cultivator or grain-drill the width of which can be adjusted without varying the number of the teeth, so that as a cultivator the teeth will run close together and thoroughly plow the ground or as a grain-drill the grain can be distributed over the entire surface by bringing the teeth nearer together, the arrangements of the parts herein being especially well adapted to accomplish this result. I accomplish these objects of my invention by the devices shown in the accompanying drawings, in which—

Figure 1 is a side elevation of a grain-drill embodying all the features of my invention. Fig. 2 is a top plan view of the same. Fig. 3 is a detail view of the tongue and braces connected thereto. Fig. 4 is an enlarged detail view of one end of the front bars B of the frame, taken on line 4 4 of Figs. 2 and 5. Fig. 5 is an enlarged detail sectional view taken on line 5 5 of Fig. 4. Fig. 6 is an enlarged detail sectional view taken on line 6 6 of Fig. 5. Fig. 7 is an enlarged detail sectional view of a portion of the rear bars of the frame, taken on line 7 7 of Figs. 2 and 8. Fig. 8 is an enlarged detail sectional view taken on line 8 8 of Fig. 7. Fig. 9 is a detail view, the tooth being partly in section, of one of the teeth of the drill embodying my improved spring-break or "spring break-off," so called, taken on line 9 9 of Fig. 10. Fig. 10 is an enlarged detail rear view of one of the drill-hoes embodying my invention. Fig. 11 is an enlarged detail sectional view on line 11 11 of Fig. 9. Fig. 12 is an enlarged detail sectional view on line 12 12 of Fig. 9. Fig. 13 is a side elevation of my invention as adapted to a cultivator-tooth. Fig. 14 is a rear view of the same, and Fig. 15 is a sectional view on line 15 15 of Fig. 13.

In the drawings all of the sectional views are taken looking in the direction of the little arrows at the ends of the section-lines, and similar letters of reference refer to similar parts throughout the several views.

Referring to the lettered parts of the drawings, the main frame consists of the front bars B and the rear bars B', which are united together at their ends by the side bars A A, all of which are pivotally connected together at the corners. Rigidly attached to the side bars A are axles at right angles thereto, on which the wheels J J are adapted to revolve when the machine is in operation. A tongue F is pivoted to the center of the front bar B and the rear bar B' parallel with the sides A A. To the sides of the tongue, in front, are situated guard-bars H, on which the slides I I are adapted to move. To the front of the bars H are situated two lever-catches j, which are pivoted at j' j' and are connected to the central bolt k by the pivot j''. The spring k' tends to throw the bolt ahead and throw the ends of the catches j out. Brace-rods G G are attached to the front bars B of the frame by the pivots b, and to these slides I I are pivoted by means of the bolts b' b'.

All of the bars of the device transverse to the line of the machine are either pivotally connected or are connected by universal joints, so that in operation my improved cultivator or drill can be thrown at an angle to the line of draft to either side.

When one of the slides I is forward and engaged by its catch j, the machine will be held in that position firmly to be operated. When the opposite side of the field is reached, the catch is loosened from this slide I by pulling the lever M, and in turning around the slide will move back relative to the position of the tongue until it comes to the rear and the slide I on the other side is moved forward and engaged by its catch, so that the angle of the teeth to the direction of the land will be always the same to prevent a ridge being formed between each cut of the machine.

It will be noted in the drawings that I have shown the usual roller C for raising the teeth of the drill, on which the usual chains i i are attached to lift the hoes of the drill. The ends of this roller are attached to the side pieces A A by a ball-and-socket joint C' or any other universal joint, for reasons that are obvious. The roller C is actuated by the lever K, pivoted at K', operating by a suitable catch in the notched segment L to elevate the drill-teeth when not in use. Above the general frame is supported a box D for carrying the seed, which is secured to the rear bar B' of the frame and adapted to swing with it.

Any suitable gear or mechanism is used in connection with the seed-box, and as my invention does not pertain to the construction of the feed mechanism none has been illustrated. The feed mechanism, however, is operated from one of the wheels J by the gear g', meshing with the gear g. The gear g is carried in a suitable journal-box f on one of the side pieces A. This is connected by a universal joint c to the shaft d, which is also connected by a universal joint c to the shaft d', which is made square and is adapted to slide back and forth through the gear e, which is carried in suitable bracket-bearings e' e' in proper relation to the seed-box D to operate the same. Any flexible shaft or tumbling-rod can be used in place of the shaft d. I have shown no means of throwing my improved drill into or out of gear, as that is no part of my invention. Any suitable means already well known can be employed.

The usual draw-bars or beams E E E are shown, and are pivoted to the front bar B at h h by being attached to a block R, which rotates on a sleeve R', against which the top and bottom bars B are bolted to hold them securely in place. The bars pass to each side of the bolts r, which bolt the top and bottom of the bars B' B' together, which are held apart by the sleeve T. The draw-bars or beams E are also pivoted to allow the up-and-down motion of the machine on the bolts n through the blocks R at the front of the machine. This provides all movement that will be required for the hoes of the drill or the teeth of the cultivator. The double pivoting is necessary to provide for the swinging of the frame and to provide for the adjustment of the height of the teeth.

In the drill the bars or beams E project backward to the usual convenient position for the same, and in a clip at the back are bolted the pieces of spring which constitute the leg E', on which the hoe P of the drill is carried.

The leg E', which projects down to the hoe of the drill, consists of two flat strips of steel, which are bent parallel to each other, and these are pivoted independently in the hoe of the drill at l and m and are left free to separate from each other in action up to the point where the clip at the rear end of the beam E of the drill is located. When the hoe encounters an unusual obstruction, stress is put upon the same, which carries it back, as indicated by dotted lines in Fig. 9, which will separate the two springs of the leg and allow the same to pass over any obstruction and assume the normal position when the obstruction is passed. The flattened springs E' of the leg form the back of the hoe of the drill to prevent any grain from escaping.

It will be noted that the lower front side of the hoe of the drill is broad and flat and is designed, as will be readily understood, to cut the trench with a broad flat bottom, so that the grain dropping into the same will spread over the entire bottom of the trench, when the dirt will drop back upon the same and cover it. The tooth following in the rear will entirely cover the trench, so that there will be only one tooth at one side of the drill which has made a furrow which is not completely and thoroughly covered. When the direction is reversed on the return, the drill is reversed, so that the tooth coming next to that side will effect the object of covering the same and will leave the ground even.

When my invention is adapted for use as a cultivator, it will take the form shown in Figs. 13, 14, and 15. In that instance it will be found to be expedient to make the beam and leg to the tooth all of the same piece of metal, as is indicated in Fig. 13. The beam and leg should be made of spring-steel, consisting of two bars bent parallel with each other.

Around the same, at the top of the leg or at any point of adjustment required, a band or loop E'' is placed. The lower ends of the springs of the leg E' are pivoted independently at $l$ and $m$ in the drill hoe or tooth. The action of the same when an obstruction is encountered will be readily understood from Fig. 13. The tooth P' bends or turns back and passes the obstruction and assumes the normal position as soon as the obstruction is passed, the same as the drill hoe or tooth as above described.

The details of my improved device can be considerably varied without departing from my invention.

I desire to state that when my improved spring break or break-off is used in a cultivator the leg E' and the beam can be all made of one piece, the beam extending to the forward part of the machine, where it is attached to the forward connection of the frame, and the hoe of the drill can be constructed in like manner; but when my improved break is used in connection with the drill the construction I have shown for that purpose will be preferred on account of the ease of its adjustment, and when the construction is used as shown in the drill the strength of the spring of the leg is fixed by moving the leg up through the clip in the end of the beam E.

I desire to state that when my improved cultivator-leg is used for carrying a cultivator-tooth any tooth that can be used anywhere can be used in connection therewith, and thus it secures all of the advantages of any form of tooth, it being adapted for use where any ordinary cultivator-leg can be used.

Other means will readily suggest themselves to a skilled mechanic for adjusting the slides I on the sides of the tongue, and different styles of seed-boxes and probably different connections for them would be required to attach to the side pieces, and the gear connection at that point can also be varied, and the exact form of the beams and cross-pieces and the exact construction of the various parts of the frame can be varied almost indefinitely without departing from my invention.

Having thus described my invention, what I claim as new, and desire to secure by Letters Patent, is—

1. In a cultivator or grain drill, the combination of the main frame composed of the forward bars, B, the rear bars, B'; side pieces, A, pivoted to the ends of said bars, B, B'; axles rigidly attached to said side bars, A, bearing wheels, J; a tongue pivoted to the center of the forward bars, B, and to the center of the rear bars, B', parallel with the side bars, A; the braces, G, G, pivoted to said frame and extending forwardly; slides, I, I, to which the forward ends of said braces, G, are pivoted; bars, H, H, to each side of said tongue, F, along which said slides move; and catches, $j$, for engaging either of said slides, I, in the notches at I'; and a rod, M', connected to both of said catches to operate the same; and a lever, M, for operating said rod, M'.

2. In a cultivator or grain drill, the combination of the main frame, with rigid sides and ends the parts of which are pivotally connected together; a tongue to operate said frame pivotally connected to both the front and rear of said frame and parallel to the sides thereof; axles rigidly attached to the sides of said frame and bearing wheels; and braces pivoted to said frame extending forwardly to said tongue along which they can be adjusted to hold the frame at any angle required to the direction of the tongue, for the purpose specified.

3. In a cultivator or grain drill, the combination of the frame, the parts of which are pivotally connected together; a tongue pivotally connected to said frame to serve as a lever to operate the same; adjustable slides on said tongue and suitable braces from the frame to said slides for adjusting said frame to any desired angle with relation to the tongue to accomplish the reverse alignment, for the purpose specified.

4. In a grain drill, the combination of the main frame, the sides of which are pivotally connected together; a tongue pivotally connected to said frame; and suitable means of adjusting the frame to any convenient angle in relation to said tongue; a seed box, D, supported on the rear bar of said frame and adapted to swing therewith; a tumbling rod, $d$, actuated from one of the wheels of said machine, having a sliding connection with the gear of said seed box, for the purpose specified.

5. In a cultivator or grain drill, having a frame the parts of which are pivotally connected together, the forward bars, B, of said cultivator in combination with the bolts $h$; the sleeves, R', thereon for uniting the said bars together the blocks, R, pivoted on said sleeves, R'; the beams, E, the teeth or hoes pivotally connected by a horizontal pivot, $n$, to the block, R, extending rearwardly and supporting the tooth or hoe at the rear end thereof; a suitable guide in the rear portion of the frame passing between the bars of the beam, E, consisting of the sleeve, T, on the bolt, $r$, between the upper and lower parts of the rear bar of the frame, B', to allow the teeth and beams to accommodate themselves to the shifting position of the frame, all substantially as described for the purpose specified.

6. In a cultivator or grain drill, the combination with the beam, of the leg composed of two parallel strips of spring steel in close relation to each other; and the tooth below pivotally connected independently to each part of said leg, substantially as described.

7. In a cultivator or grain drill, the combination with the beam; of the leg composed of two parallel strips of steel in close relation to each other, the one back of the other; the tooth below pivotally connected to the spring portions of said leg, the pivot of the forward spring being situated above the pivot of the rearward spring so that in operation, when the tooth strikes an obstacle, it will be allowed to fold back and will be returned to its place by the combined action of the two springs, for the purpose specified.

8. In a cultivator or grain drill, the combination with the beam, of the leg composed of two parallel springs of steel in close relation to each other, the one back of the other; the tooth below pivotally connected to the spring portions of said leg, the pivot of the forward spring being situated above the pivot of the rearward spring so that in operation, when the tooth strikes an obstacle, it will be allowed to fold back and it will be returned to its place by the combined action of the two springs; and a collar as E'', for moving along said parallel springs to adjust the tension between the two to adjust the resisting force of the tooth, for the purpose specified.

9. In a cultivator or grain drill, the combination of the leg composed of two downwardly extending strips of steel; the tooth below pivotally connected independently to each part of said leg; the pivots being situated one above the other to hold the tooth in place and allow it to pass over obstructions by springing of the parts of the leg, for the purpose specified.

In witness whereof I have hereunto set my hand and seal in the presence of two witnesses.

GARLAND B. ST. JOHN. [L. S.]

Witnesses:
MARIAN I. LONGYEAR,
WALTER S. WOOD.